United States Patent

[11] 3,590,893

| [72] | Inventor | Tadeusz Burkiewicz |
| | | Traugutta 90, Gdansk-Wrzeszcz, Poland |
| [21] | Appl. No. | 699,552 |
| [22] | Filed | Jan. 22, 1968 |
| [45] | Patented | July 6, 1971 |
| [32] | Priority | Jan. 21, 1967 |
| [33] | | Poland |
| [31] | | 118,629 |

[54] METHOD OF FASTENING BLADES TO SAWING TOOLS
7 Claims, 2 Drawing Figs.

| [52] | U.S. Cl. | 143/145 |
| [51] | Int. Cl. | B27b 33/12 |
| [50] | Field of Search | 143/145, 154 |

[56] References Cited
UNITED STATES PATENTS

| 148,027 | 3/1874 | Branch | 143/153 X |
| 174,216 | 2/1876 | Emerson | 143/145 |
| 303,787 | 8/1884 | Arnold | 143/145 |

FOREIGN PATENTS

| 20,576 | 7/1911 | Great Britain | 143/154 |

Primary Examiner—Donald R. Schran
Attorney—Waters, Roditi, Schwartz & Nissen

ABSTRACT: A saw blade having cutting bodies wedged in resilient seats in a blade body with the cutting edges of the cutting bodies protruding from the blade body.

PATENTED JUL 6 1971 3,590,893

METHOD OF FASTENING BLADES TO SAWING TOOLS

BRIEF SUMMARY OF THE INVENTION

The invention relates to the securing of cutting bodies in a blade body of a saw.

It is known to fasten carbide cutting bodies to a holder or blade body by soldering, brazing or welding. However, this has not proven to be satisfactory to hold the cutting bodies in the blade body due to the relatively small area of contact between the cutting bodies and the blade bodies. This small area results in a relatively low strength of the joint between each cutting body and the holder, and moreover makes it difficult to obtain uniform and reliable joints. Consequently, the resulting saw blade is not adaptable for general use under all sawing conditions, but is limited to relatively light work. Even under such restricted usage, such blades are subject to separation of the cutting bodies from the holder. A further disadvantage of such mounting of the blades in the holder, is that the joints must be subjected to grinding after the soldering, welding or brazing to form a smooth continuous surface. This involves the use of special grinding machines, which is laborious and expensive.

The present invention seeks to overcome the above disadvantages, and an object of the invention is to produce a saw blade in which the cutting bodies are reliably secured without the need for welded, soldered or brazed joints.

A further object of the invention is to provide a joint between a cutting body and a blade body by a wedged, frictional engagement between the cutting bodies and the blade body. Such frictional engagement is obtained by the wedging of the cutting bodies in elastic seats of particular shape which are formed in the blade body.

In particular, according to the invention, the seats are formed by nonplanar edges which are inclined towards one another and define a slot in the blade body extending in narrowing manner from an enlarged opening in the blade body to the exterior of the blade body. Preferably, the edges are of V-shape with their apexes facing one another. The cutting bodies have edges of corresponding shape as that of the seat edges so as to slidably interfit with such edges. The cutting bodies are assembled in the blade body by being inserted into the enlarged openings and then driven into the slots until they are wedged therein. Thereby the cutting bodies are secured in the blade body. A slit can be formed in the blade body adjacent said slot so as to form a flexible tongue therebetween, one of the edges of the seat being on said tongue.

A saw blade of the above construction and assembly is simple to construct and is reliable in operation inasmuch as the cutting bodies are retained in the blade body and do not separate as in the known blades. Moreover, the cutting bodies can be removed when they become worn and replaced by fresh cutting bodies. This affords great economy of tool steel and extends the life of the blade bodies. The use of such inserted cutting bodies also permits great variation in the tool contour and blade angles due to the replaceability of the cutting bodies. Moreover, due to their secure engagement in the blade body the cutting bodies can be ground on a common grinding machine. Additionally, it has been found that such inserted cutting bodies eliminate transverse vibration in circular saws due to the elimination of unbalancing weld, solder, or brazing material.

DETAILED DESCRIPTION

Figure 1:
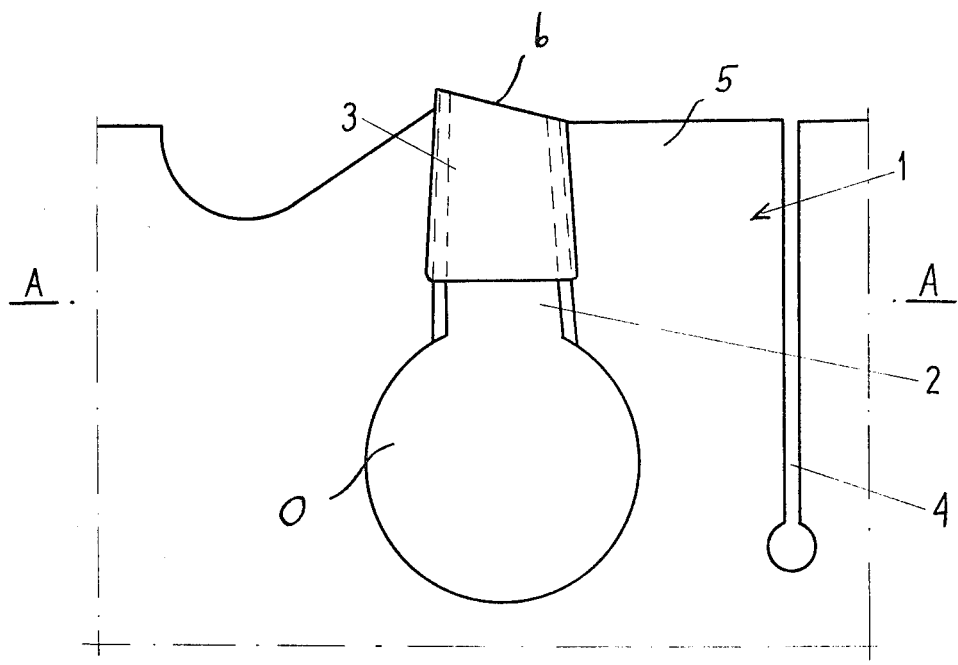
FIG. 1 is a diagrammatic illustration of a cutting body mounted in a blade body, in accordance with the invention.
Figure 2:
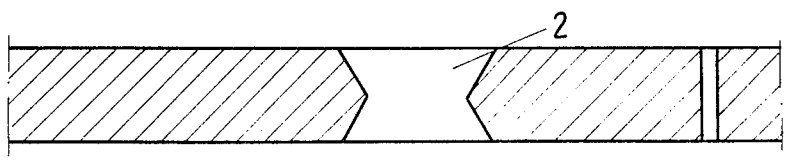
FIG. 2 is a sectional view taken along line A-A in FIG. 1.

In the drawing there is shown a blade body 1 having a seat 2 in which a cutting body 3 is mounted. The seat 2 has opposite V-shaped edges which define a slot therebetween extending from a circular opening O to the exterior of the blade body. The slot narrows from the opening O to the exterior of the body 1. A slit 4 is provided in body 1 adjacent the slot, to form an elastic tongue 5, one edge of which is an edge of the seat 2.

The cutting body 3 has edges of corresponding shape as those of the seat 2 such that the cutting body 3 can be slidably interfitted in the seat 2.

In assembling each of the cutting bodies in the blade body, the body 3 is inserted into opening O, which is sufficiently large to enable such insertion, and then the cutting body is driven into slot 2 towards the exterior of body 1 until the body 3 is wedged in the seat 2.

The cutting body 3 has a cutting edge 6 which projects from the body 1, and the size of the body 3 and the slot 2 are selected so that when the cutting edge 6 is in operative position, the cutting body is firmly wedged in the seat 2 to resist the application of all forces developed during a sawing operation, tending to push the cutting body back into the slot. The flexibility of the tongue 5 aids not only in the insertion of the body 3 into the slot during assembly, but it causes the tongue to be applied elastically against said body 3 to hold the same in its wedged position. Thus, due to the flexibility of the tongue 5, the seat 2 is somewhat elastic, this being an important aspect of the invention.

The shape of the cutting edge 6 of body 3 and the form of the adjacent edge of the blade body can be varied as desired. Moreover, cutting bodies with different shape cutting edges can be employed to correspond with the different cutting operations which are contemplated.

To replace a cutting body 3 when it is worn, or to provide a different cutting edge as desired, the cutting body is driven into the slot into opening D and withdrawn. The replacement cutting body is then mounted in the manner previously.

Although the invention has been described with reference to a preferred embodiment, it will become evident to those skilled in the art to perform numerous variations and modifications, within the scope and spirit of the invention as defined in the attached claims.

What I claim is:

1. A saw blade comprising a blade body, means defining a resilient seat in said body, and a cutting body wedged in said seat and having a cutting edge protruding from said body, said seat having opposite edges which are inclined towards one another, said cutting body being wedged against said edges, said edges of said seat defining a slot therebetween which opens externally of the blade body, said blade body being provided with an enlarged opening into which the slot extends at the interior of the blade body, said enlarged opening being of sufficient size to enable the cutting body to be inserted therein and wedged in the seat by advancement in the slot towards its external opening in the blade body, said means which defines said elastic seat being constituted in part by an empty slit in said cutting body extending proximate said slot whereby a flexible tongue is formed between said slot and said slit, one of the edges of said seat being on said tongue.

2. A blade as claimed in claim 1, wherein said edges of the seat are nonplanar and said cutting body has edges of corresponding shape to interfit slidably with the edges of the seat.

3. A blade as claimed in claim 1, wherein said edges of said seat have a V-shape with apexes facing one another.

4. A blade as claimed in claim 3, wherein said slot narrows in size from said enlarged opening towards the exterior of the blade body.

5. A blade as claimed in claim 4, wherein said enlarged opening is circular.

6. A blade as claimed in claim 5, wherein said cutting body has a width in relation to said slot such that when inserted into said slot, the cutting body is wedged against said edges of the seat as the cutting edge reaches an operative protruding position from the blade body.

7. A blade as claimed in claim 6, wherein said cutting body is constituted of material which is substantially tougher than that of said blade body.